United States Patent
Viswanadham et al.

(10) Patent No.: US 6,286,406 B1
(45) Date of Patent: *Sep. 11, 2001

(54) INJECTION MOLDED CARBIDE CUTTING INSERT

(75) Inventors: Ramamurthy K. Viswanadham, Prospect; Carl Shumaker, Louisville; David Brutscher, Louisville; Donald C. Pennington, Jr., Louisville, all of KY (US)

(73) Assignee: Credo Tool Company, Woodburn, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

This patent is subject to a terminal disclaimer.

(21) Appl. No.: 09/249,474

(22) Filed: Feb. 12, 1999

Related U.S. Application Data

(60) Continuation-in-part of application No. 09/044,815, filed on Mar. 20, 1998, now Pat. No. 6,000,312, which is a division of application No. 08/600,350, filed on Feb. 12, 1996, now Pat. No. 5,809,848.

(51) Int. Cl.⁷ .................................................. B23D 57/00
(52) U.S. Cl. .............................................. 83/835; 83/839
(58) Field of Search ...................... 76/112, 25.1; 83/835, 83/846, 847, 848, 840, 845, 854, 849, 839; 451/542, 543; 125/15

(56) References Cited

U.S. PATENT DOCUMENTS

| | | |
|---|---|---|
| 324,945 | 8/1885 | Lucas . |
| 336,568 | 2/1886 | Jackson . |
| 2,073,678 | 3/1937 | Broughton . |
| 2,361,492 | 10/1944 | Pare . |
| 2,721,488 | 10/1955 | Eaton . |
| 2,736,312 | 2/1956 | Goldman . |
| 3,110,579 | 11/1963 | Benson et al. . |
| 3,122,030 | 2/1964 | Metzger . |
| 3,133,533 * | 5/1964 | Sprague ................................. 125/15 |
| 3,162,187 | 12/1964 | Christensen . |
| 3,788,182 | 1/1974 | Tyler . |
| 4,690,024 | 9/1987 | Chaconas . |
| 4,727,778 | 3/1988 | Omi . |
| 4,784,033 | 11/1988 | Hayden et al. . |
| 4,889,025 * | 12/1989 | Collett .................................... 83/846 |
| 5,040,436 | 8/1991 | Pfaltzgraff . |
| 5,658,604 * | 8/1997 | Gellert et al. ....................... 425/549 |
| 6,000,312 * | 12/1999 | Viswanadham et al. .............. 83/835 |

FOREIGN PATENT DOCUMENTS

| | | | |
|---|---|---|---|
| 4200420 * | 7/1993 | (DE) ..................................... 83/835 |
| 39113 * | 2/1987 | (JP) ...................................... 83/835 |
| 305601 * | 11/1993 | (JP) ...................................... 83/835 |
| 1544558 * | 2/1990 | (RU) ..................................... 83/835 |
| WO 95/10359 | 4/1995 | (WO) . |

\* cited by examiner

Primary Examiner—Thomas Hughes
Assistant Examiner—Marc Jimenez
(74) Attorney, Agent, or Firm—Charles G. Lamb; Middleton & Reutlinger

(57) ABSTRACT

A cutting tool insert includes a cutting tip mounted into a first recess of an injection molded hard refractory compound insert having a second recess of preselected size and shape for locating the insert to a cutting tool. A preferred cutting tip is a diamond and a preferred hard refractory compound is a tungsten carbide with a cobalt binder.

8 Claims, 2 Drawing Sheets

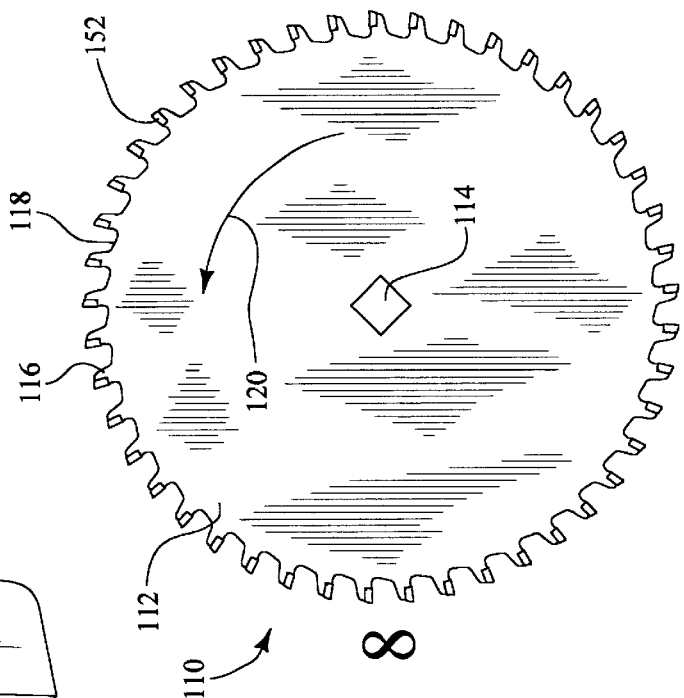
FIG. 8
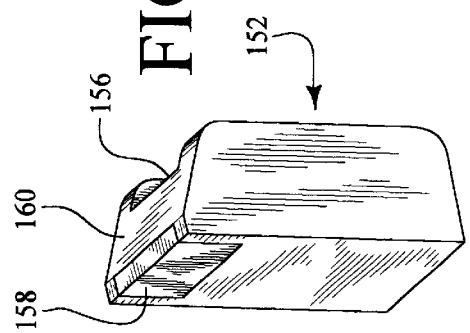
FIG. 6
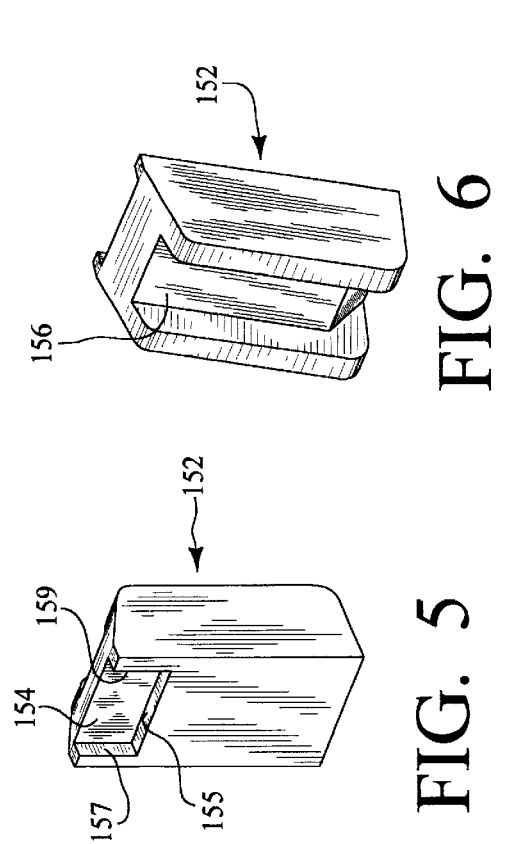
FIG. 7
FIG. 5
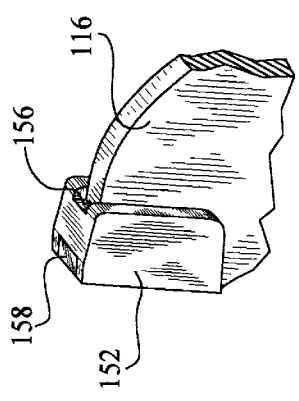
FIG. 9

INJECTION MOLDED CARBIDE CUTTING INSERT

REFERENCE TO RELATED APPLICATION

This is a continuation-in-part application of Ser. No. 09/044,815 filed Mar. 20, 1998 now U.S. Pat. No. 6,000,312 issued Dec. 14, 1999 which is a divisional application of U.S. Ser. No. 08/600,350 filed Feb. 12, 1996 now U.S. Pat. No. 5,809,848 issued Sep. 22, 1998.

BACKGROUND OF THE INVENTION

The present invention relates to cutting devices and more particularly to a method of making an injection molded carbide insert for receiving a cutting tip therein.

Cutting tools using carbide cutting tips or carbide inserts with diamond cutting tips have been known for many years. However, in the manufacturing of cutting tools with diamond cutting tips, the attachment of diamonds to inserts or attachment to the tips of the cutting tools, particularly saw blades and the like, have presented many difficulties. Specifically, diamonds have presented difficulties in maintaining their bonds to a cutting blade of a cutting tool for prolonged use.

Many different methods have been tried to bond diamonds onto cutting tools. For example, U.S. Pat. No. 3,162,187 teaches the use of a tungsten or tungsten carbide of a suitable mesh which is impregnated with diamonds into the mesh. The diamond impregnated matrix is positioned on opposite sides of a steel reinforcing member and the steel reinforcing member is placed into a furnace at a preselected temperature for bonding the diamond impregnated matrix to the steel insert. The finished insert is then inserted into an appropriate groove in a cutting tool wherein the steel-tungsten-diamond insert is brazed in place.

U.S. Pat. No. 3,122,030 teaches a method of assembling a rotary saw blade with peripheral diamond teeth wherein the cutting part consists of a metallic matrix with crushed or fragmented diamonds distributed substantially uniformly through the matrix. The matrix is sandwiched between two steel lugs which are bonded to a tooth of a saw blade.

U.S. Pat. No. 3,110,579 also teaches a diamond tipped saw blade wherein the cutting elements of the saw blade are composed of a diamond grit embedded and dispersed in a matrix material, such as a mixture of bronze and iron. The cutting element is inserted into a groove in the blade with the diamond cutting element being bonded into the grooves.

SUMMARY OF THE INVENTION

It is an object of the present invention to provide an improved cutting tip for cutting tools.

It is another object of the present invention to provide an improved diamond cutting tip for cutting tools.

It is even another object of the present invention to provide an injection molded carbide insert for a cutting tool.

It is a further object of the present invention to provide an injection molded carbide insert for a cutting tool having two recesses of preselected size on opposite sides of the insert, one receiving an edge of a cutting blade of a cutting tool and the other recess receiving a diamond cutting tip.

More particularly, the present invention provides a method of making a cutting blade insert for a cutting tool comprising steps of:

preparing a mixture including a spray-dried hard refractory compound;

transferring said mixture to a molder;

injection molding said mixture to a preselected cutting blade insert shape including a first recess for a cutting tip and a second recess for attaching to a cutting tool;

sintering said cutting blade insert;

placing a cutting tip in said first recess; and, brazing said cutting tip in said first recess.

Preferably, the cutting tip is a diamond cutting tip and the mixture for the molder contains tungsten carbide with a cobalt binder.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWINGS

A better understanding of the present invention will be had upon reference to the following description in conjunction with the accompanying drawings wherein:

FIG. 1 is a block flow diagram showing the steps of making a carbide insert of the present invention;

FIG. 2 is a perspective view of one preferred embodiment of the present invention showing the recess for receiving a cutting tip on the top side of the injection molded insert;

FIG. 3 is a perspective view of the injection molded insert of FIG. 2 turned 180° showing the recess for receipt of a cutting tool on the top side of the insert;

FIG. 4 is a perspective view of the insert of FIGS. 2 and 3 with a cutting tip received within the cutting tip recess of the insert;

FIG. 5 is a perspective view of another preferred insert of the present invention shown from the front of the insert;

FIG. 6 is a perspective view of FIG. 5 shown form the back of the insert;

FIG. 7 is a perspective view of FIG. 5 shown with a cutting tip therein;

FIG. 8 is a side view showing a circular saw blade with injected molded carbide inserts of the present invention thereon; and, FIG. 9 is an enlarged perspective view of a section of the cutting blade of FIG. 8 showing details of the injection molded carbide insert and cutting tip of FIG. 7 mounted thereon.

DETAILED DESCRIPTION OF THE PREFERRED EMBODIMENT

Figures 1, 2, 3, 4:
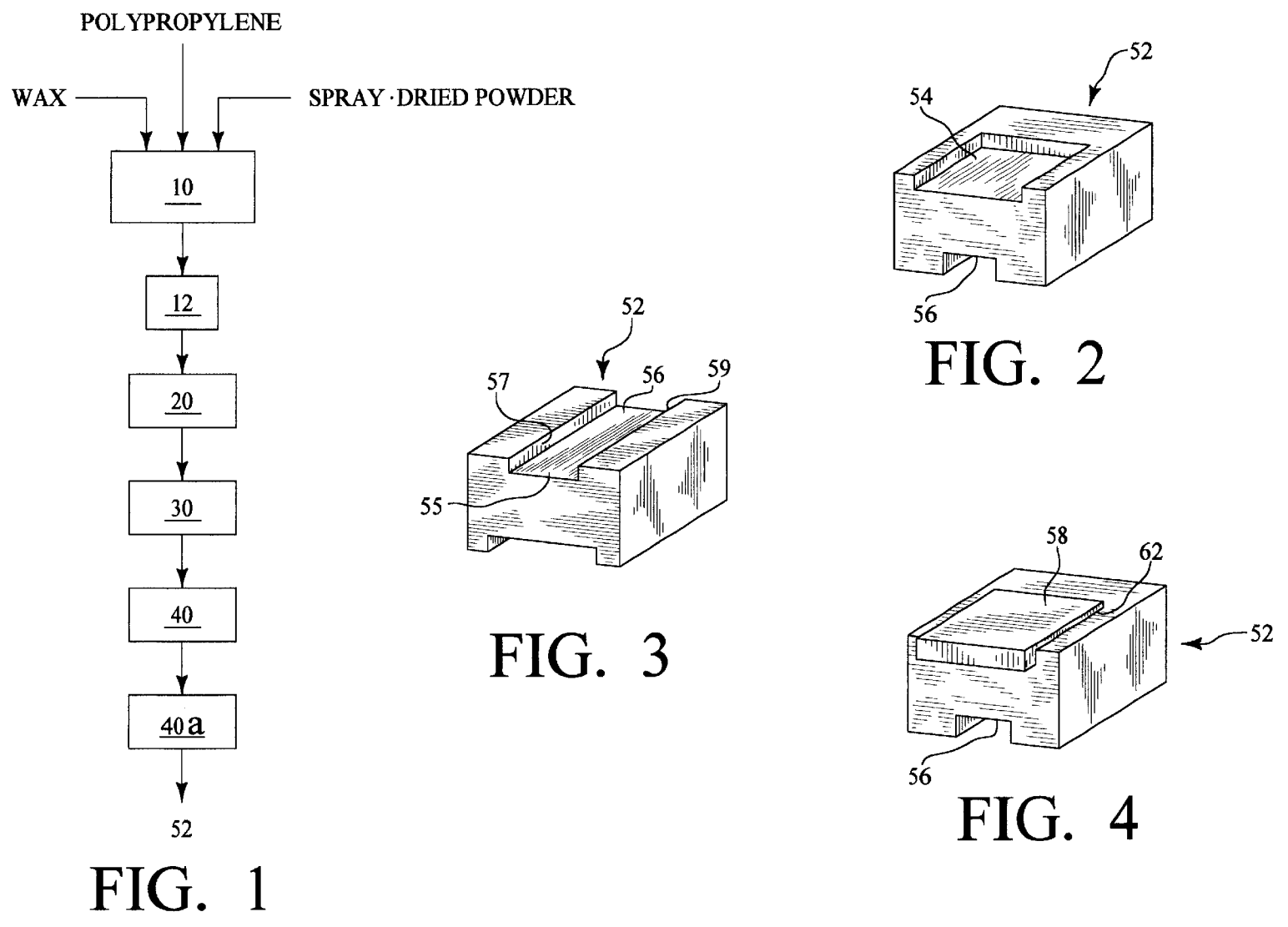

Referring to FIG. 1, from about 4 to 6 parts by weight of wax, which is generally paraffin, from about 2 to 4 parts by weight of polypropylene, and from about 90 to 94 parts by weight of a spray dried powder is added to a mixer, such as a sigma-type mixer as identified by numeral 10. The spray dried powder is typically a mix of a hard refractory compound, such as tungsten carbide, and a metallic binder, such as cobalt and a wax, the cobalt being from 3 to 25% by weight of the powder. These ingredients are thoroughly mixed at a temperature of from about 150 to 20020 C. for generally from 1 to 3 hours. The mixture is allowed to cool to ambient and then granulated in any well-known granulator 12 to a size of usually less than ⅛" in diameter. This mixture is fed into an injection molder 20. The injection molder 20 is provided with a die of preselected size and shape so that the resulting molded product 52 is as shown in FIGS. 2, 3 and 4. The molding step is carried out at from about 150 to 200° C., generally about 170° C., at a pressure of from about 12,000 to 15,000 psi. The resulting molded product in a "green" condition is then submitted to a de-binding tank 30 which is maintained at 40 to 60° C. wherein the wax is removed by the recirculation of a solvent, generally naphtha. The resulting wax free product is then transferred to a thermal debinding operation which is carried out in a furnace identified by numeral 40 at from about 150° C. to about 500° C. for a period of about 6 to 12 hours. The resulting thermal debound product may either be transferred to a separate sintering furnace or left in the furnace 40 and taken up to sintering temperatures. The sintering of the debound product generally occurs at about 1400° C. with a step-wise increase in the temperature from the thermal debinding temperature up to about 1400° C. at a rate of about 1 to 10° C. per minute. The sintered product 52 is then cooled in the furnace to ambient, then removed and cleaned, usually by "grit" blasting. The sintered product 52 is then ready for receiving a cutting tip in a first recess identified by numeral 54 in FIG. 2.

The resulting sintered injection molded product 52, as best shown in FIGS. 2 and 3, includes the recess 54 of preselected size and shape to receive a cutting tip therein and a second recess 56, which is on a side opposite the recess 54. Recess 54 is defined by a bottom wall 55, side walls, 57, 59 and a top opening. Second recess 56 is of a shape and size to receive the outer peripheral edge of a cutting tool, such as a circular saw blade 110 as shown in FIG. 8.

As shown in FIG. 4, a cutting tip 58, generally diamond, such as a polycrystalline diamond (PCD) or diamond made by chemical vapor deposition (CVD), which is well known in the art, is received within the recess 54. It is also realized that the cutting tip 58 may be, for example, a polycrystalline boron nitride or the like. The cutting tip 58 is then cut into a preselected size for fitting into the cutting tip or first recess 54 of the insert 52. Tip 58 is bonded as denoted by the numeral 62 into the recess 54 by any well known means, particularly brazing, using a silver-base alloy brazing material or an equivalent.

As shown in FIGS. 5, 6, and 7, a diamond cutting tip 158 is received within recess 154 of an injection molded carbide insert 152. Insert 152 is provided with an angled top surface 160 which extends in an angularly downward direction from the open end of recess 154 to the open top end of second recess 156 which receives the outer peripheral edge of a cutting tool, such as a tooth 116 of a saw blade, as shown in FIG. 9. The recess 154, defined by the two side walls 157 and 159, bottom wall 155 and an open top has a depth substantially the same as the thickness of the diamond tip 158 to be received therein. Furthermore, the distance from the bottom wall 155 to the open top is substantially equal to the length of the diamond 158 received within the recess 154 so that the diamond tip 158 fits flush within recess 154. It is realized that even though the diamond cutting tip 158 is shown flush within recess 154, tip 158 may extend beyond the recess 154 or recess 154 may have a depth greater than the thickness of the tip 158 and the distance from the bottom wall 155 to the open top of recess 154 may be greater than the length of the diamond cutting tip 158. Recess 154 may be merely for locating the cutting tip on the insert at a specific position. The diamond cutting tip 158 is bonded into the recess 154 by any well known means, such as, for example, vacuum brazing.

Referring now to FIGS. 8 and 9, a circular saw blade 110 for receiving the injection molded carbide insert 152 thereon is shown. The circular saw blade 110 is generally a disc-like circular body, identified by the numeral 112, with a central opening 114 therein to facilitate the mounting of the saw blade onto a spindle of a drive mechanism for the saw blade. A plurality of equally spaced teeth 116 and a corresponding plurality of gullets 118 are formed integral with and about the periphery of the body 112 with the gullets 118 being interspersed between the spaced teeth 116. Each gullet 118 is formed with a concave surface which faces outwardly from the periphery of the body 112 and is located, as shown by the arrow identified by the numeral 120.

As best shown in FIG. 9, the carbide insert 152 is mounted onto each tooth 116. Each tooth 116 is provided with a cut-out portion on the cutting edge of the tooth 116 of a preselected size to receive the insert 152. The recess 156 of the insert 152 is of substantially the same thickness as the tooth 116 and from top to bottom is of a greater distance than the cut-out of the cutting edge of the tooth 116. Thus, the injection molded carbide insert 152 on the tooth 116 extends beyond the cutting edge of the tooth 116 so that the insert 152 with the diamond cutting tip 158 is in contact with the material to be cut. Moreover, the diamond cutting tip 158 which is flush with the recess 154 of the injection molded insert 152 is exposed to the materials to be cut when first placed in use. However, since the carbide insert is of a material softer than the diamond cutting tip 158, upon initial use in an abrasive material cutting situation, within a short period of time the exposed portions of the injection molded carbide insert 152 wears down thereby further exposing the harder cutting material 158.

It will be realized that various changes can be made to the specific embodiments shown and described without departing from the principles and spirit of the present invention.

What is claimed is:

1. A cutting blade insert for a saw blade consisting essentially of:

an injection molded carbide insert having a first recess for receiving a cutting tip, and a second recess for locating said insert to a tooth of a saw blade, said first and second recesses being on opposed sides of said insert.

2. The insert of claim 1, said first recess being of a first preselected size and shape substantially the same as a cutting tip to be received therein.

3. A cutting blade insert for a saw blade consisting essentially of:

an injection molded carbide insert having a first recess for receiving a cutting tip, and a second recess of preselected size and shape for locating said insert to a tooth of a saw blade, said first and second recesses being on opposed sides of said insert; and, a cutting tip brazed into said first recess, said first recess being of substantially the same size and shape as said cutting tip, said cutting tip being flush within said first recess.

4. The insert of claim 3, said cutting tip being a diamond cutting tip.

5. The insert of claim 3, said injection molded carbide insert being a tungsten carbide.

6. The insert of claim 5, said injection molded carbide insert includes cobalt.

7. The insert of claim 3, said first recess being defined by a bottom wall, two spaced side walls and an open top, said walls being of substantially the same depth as the thickness of the cutting tip, said distance from the bottom wall to the top opening being of substantially the same length as the length of said cutting tip.

8. The insert of claim 7 having an angled top surface extending in an angularly downwardly direction from said first recess open top to said second recess.

* * * * *

UNITED STATES PATENT AND TRADEMARK OFFICE
CERTIFICATE OF CORRECTION

PATENT NO. : 6,286,406 B1
DATED : September 11, 2001
INVENTOR(S) : Viswanadham

It is certified that error appears in the above-identified patent and that said Letters Patent is hereby corrected as shown below:

<u>Title page,</u>
Item [75], Inventors, change "Prospect" to -- Elizabethtown --;

<u>Column 2,</u>
Line 36, change "form" to -- from --;
Line 60, change "20020C" to -- $200^\circ$ C --;

Signed and Sealed this

Twentieth Day of August, 2002

Attest:

JAMES E. ROGAN
Attesting Officer     Director of the United States Patent and Trademark Office